United States Patent
Sgatti et al.

(10) Patent No.: US 7,024,303 B2
(45) Date of Patent: Apr. 4, 2006

(54) METHOD FOR DETECTING MISFIRING IN AN INTERNAL COMBUSTION ENGINE BY ANALYSING THE ANGULAR ACCELERATION OF THE DRIVE SHAFT

(75) Inventors: Stefano Sgatti, Imola (IT); Carlo Siviero, Bologna (IT); Fabrizio Ponti, Forli' (IT)

(73) Assignee: Magneti Marelli Powertrain S.p.A., (IT)

( * ) Notice: Subject to any disclaimer, the term of this patent is extended or adjusted under 35 U.S.C. 154(b) by 73 days.

(21) Appl. No.: 10/773,858

(22) Filed: Feb. 6, 2004

(65) Prior Publication Data

US 2004/0220719 A1    Nov. 4, 2004

(30) Foreign Application Priority Data

Feb. 7, 2003    (IT)    ............... B02003A0055

(51) Int. Cl.
    *G06F 19/00*    (2006.01)

(52) U.S. Cl. ............... 701/111; 701/29; 73/117.3

(58) Field of Classification Search ............... 701/111, 701/29, 102, 34; 73/116, 117.3
    See application file for complete search history.

(56) References Cited

U.S. PATENT DOCUMENTS

| 5,377,535 | A | | 1/1995 | Angermaier et al. ......... 73/116 |
| 5,504,682 | A | * | 4/1996 | Shiraishi et al. ............ 701/111 |
| 5,602,331 | A | | 2/1997 | Prevost ........................ 73/116 |
| 6,055,469 | A | * | 4/2000 | Shoji et al. .................. 701/29 |

FOREIGN PATENT DOCUMENTS

| DE | 42 39 055 | | 11/1992 |
| EP | 0637738 | | 8/1994 |
| EP | 1 447 655 A2 | * | 8/2004 |

* cited by examiner

*Primary Examiner*—Hieu T. Vo
(74) *Attorney, Agent, or Firm*—Ostrolenk, Faber, Gerb & Soffen, LLP

(57) ABSTRACT

A method for detecting misfiring in an internal combustion engine by analysing the angular acceleration of the drive shaft, in which the value of the angular acceleration is estimated at predetermined angular positions of the drive shaft, the absolute value of the angular acceleration is compared with a predetermined threshold value, and the presence of a misfire is detected if the absolute value of the angular acceleration is greater than the predetermined threshold value; when the presence of a misfire is detected, a set of values of the angular acceleration subsequent to the value of the angular acceleration at which the misfire has been detected is filtered to eliminate the oscillation component generated by the misfire with respect to the value of the angular acceleration.

15 Claims, 6 Drawing Sheets

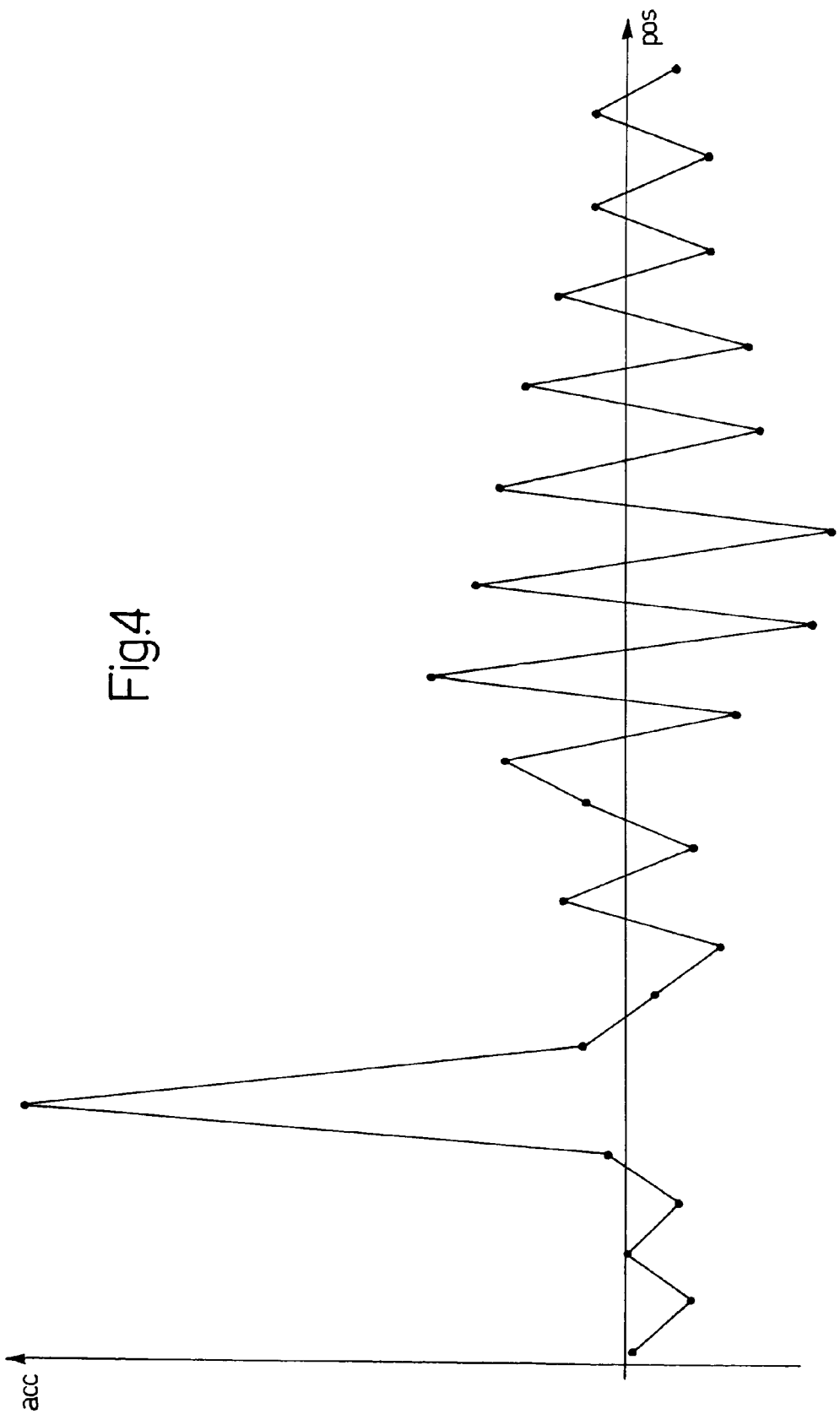

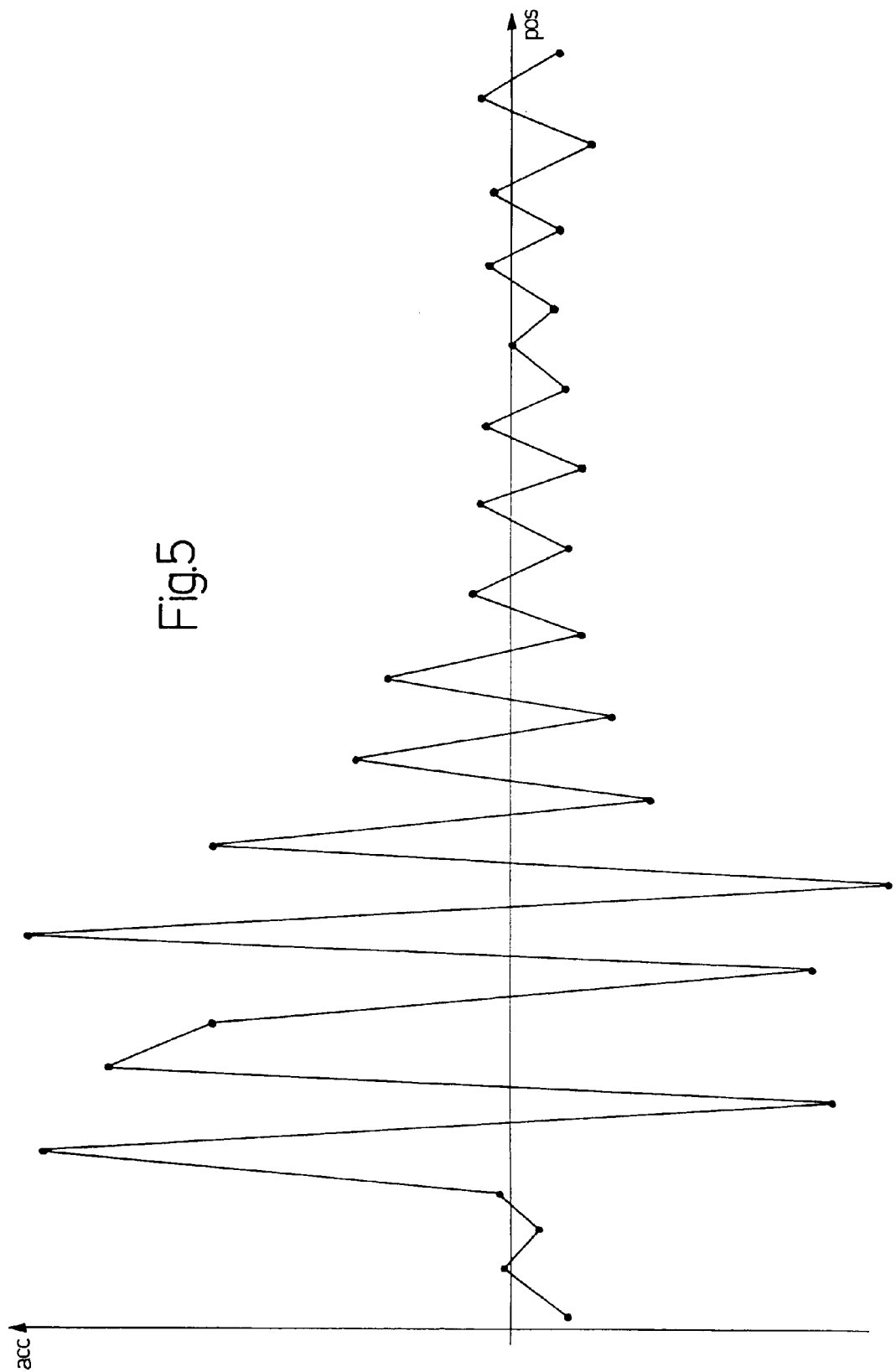

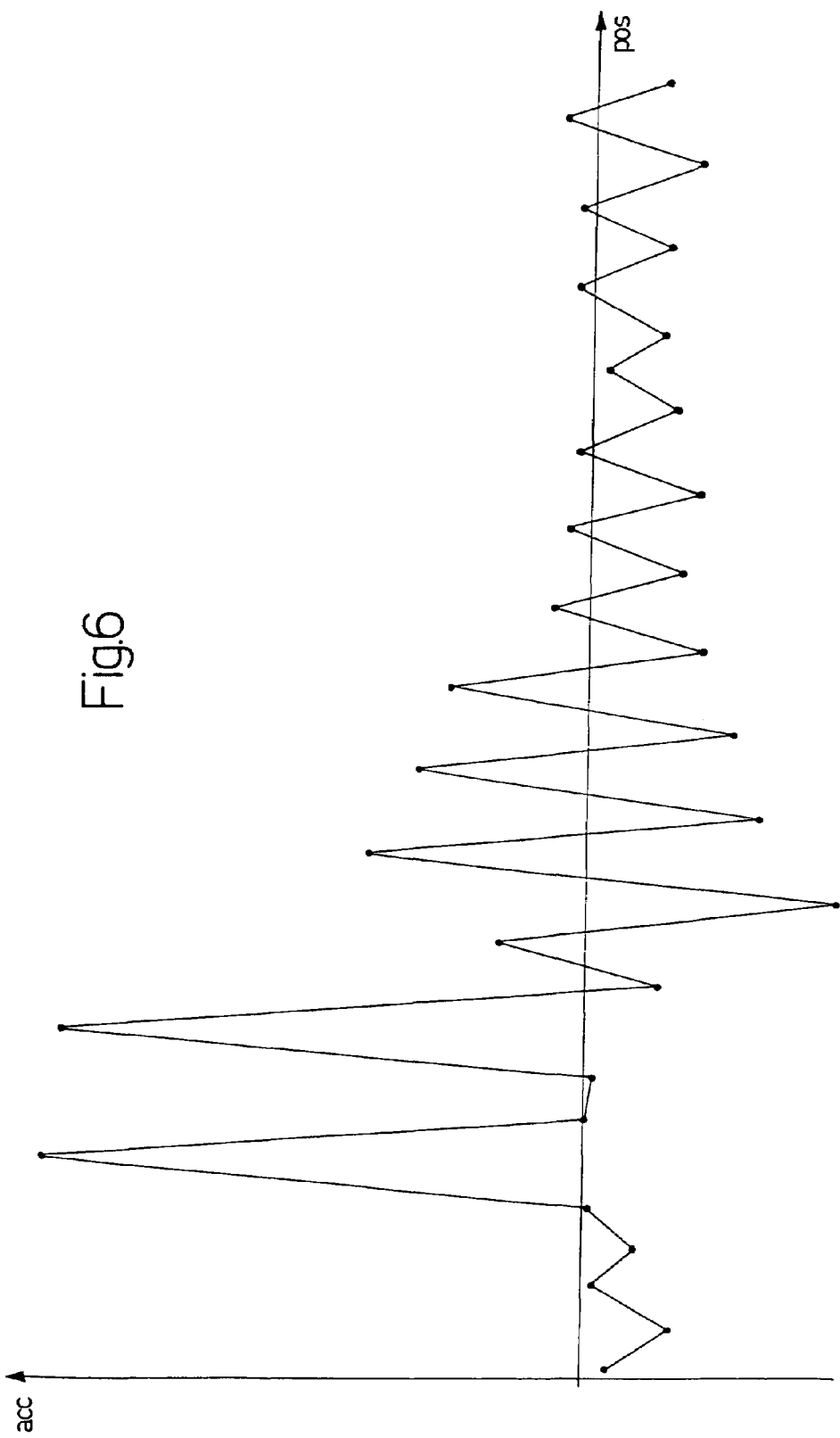

METHOD FOR DETECTING MISFIRING IN AN INTERNAL COMBUSTION ENGINE BY ANALYSING THE ANGULAR ACCELERATION OF THE DRIVE SHAFT

The present invention relates to a method for detecting misfiring in an internal combustion engine by analysing the angular acceleration of the drive shaft.

BACKGROUND OF THE INVENTION

In an internal combustion engine with controlled ignition, the term misfire or misfiring indicates a phenomenon of incorrect combustion within one or more cylinders; the misfire is in particular known as an ignition misfire when it is due to the inadequate or lacking energy of the spark generated by the spark plug, and is known as an injection misfire when it is due to a fuel supply which is inadequate or lacking.

The presence of a misfire is particularly damaging since incorrect combustion is detrimental to engine performance, increases the level of pollutant emissions from the engine and may cause permanent damage to the catalyst. For this reason, European standards on automobile vehicle emission limits require misfiring to be detected efficiently and for drivers to be informed of the presence of a misfire by means of an indicator light disposed on the dashboard. In particular, it is necessary, under European regulations on automobile vehicle emission limits, to indicate an increase in pollutant emission levels when the number of misfires in a first interval (for instance 1000 TDC—top dead centres) exceeds a first threshold, and to indicate permanent deterioration of the catalyst when the number of misfires in a second interval (for instance 200 TDC—top dead centres) exceeds a second threshold.

At present, misfiring is detected indirectly, i.e. by analysing the instantaneous value of the angular acceleration of the drive shaft or the instantaneous value of the drive torque, as a direct analysis of combustion by means of sensors disposed inside each cylinder is not practicable for reasons of cost.

The most widespread method for detecting misfiring involves analysing the angular acceleration of the drive shaft; in particular, the signal supplied by the phonic wheel is used to calculate the value of the angular acceleration of the drive shaft at predetermined angular positions of this drive shaft, and misfiring is detected if the absolute value of the angular acceleration of the drive shaft is higher than a predetermined threshold value.

It has been observed, however, that this method is not very reliable as the absolute value of the angular acceleration of the drive shaft may also exceed the threshold value as a result of causes unconnected with misfiring, such as, for instance, the coupling or uncoupling of the compressor of the air conditioning plant, the roughness of the road, or even abrupt decelerations. Moreover, in the case of a single misfire, the value of the angular acceleration of the drive shaft may be supplemented by torsional oscillations which cause the absolute value of the angular acceleration of the drive shaft to exceed the threshold value at several successive instants; in this case, a single misfire is erroneously detected as a plurality of successive misfires.

A first solution to the problems discussed above is disclosed in European Patent Application EP-0637738-A1 which discloses a method for detecting misfiring in an internal combustion engine by analysing the angular acceleration of the drive shaft; in order to try to eliminate the influence of disturbances, the value of the angular acceleration of the drive shaft is processed by creating a so-called cyclicity index which, compared with appropriate thresholds, indicates the presence of misfiring.

However, the method for detecting misfiring as disclosed in European Patent Application EP-0637738-A1 also tends erroneously to detect a plurality of successive misfires rather than a single misfire as a result of the oscillations of the value of the angular acceleration of the drive shaft triggered by a single misfire.

SUMMARY OF THE INVENTION

The object of the present invention is to provide a method for detecting misfiring in an internal combustion engine by analysing the angular acceleration of the drive shaft, which is free from the drawbacks described above and, in particular, is simple and economic to produce and is able to reduce to a minimum the percentages of incorrect and failed detections of misfiring.

The present invention relates to a method for detecting misfiring in an internal combustion engine by analysing the angular acceleration of the drive shaft as set out in claim 1.

BRIEF DESCRIPTION OF THE DRAWINGS

The present invention will now be described with reference to the accompanying drawings, which show a non-limiting embodiment thereof, in which:

FIG. 4 is a diagram showing the variation of the value of the angular acceleration of the drive shaft of FIG. 2 after the application of a filtering process using the eight correction values of FIG. 3;

FIG. 5 is a diagram showing the variation of the value of the angular acceleration of the drive shaft as a function of the angular position of this drive shaft in the presence of a double misfire;

FIG. 6 is a diagram showing the variation of the value of the angular acceleration of the drive shaft of FIG. 5 after the application of a filtering process using the eight correction values of FIG. 3.

DETAILED DESCRIPTION OF THE INVENTION

Figure 1:
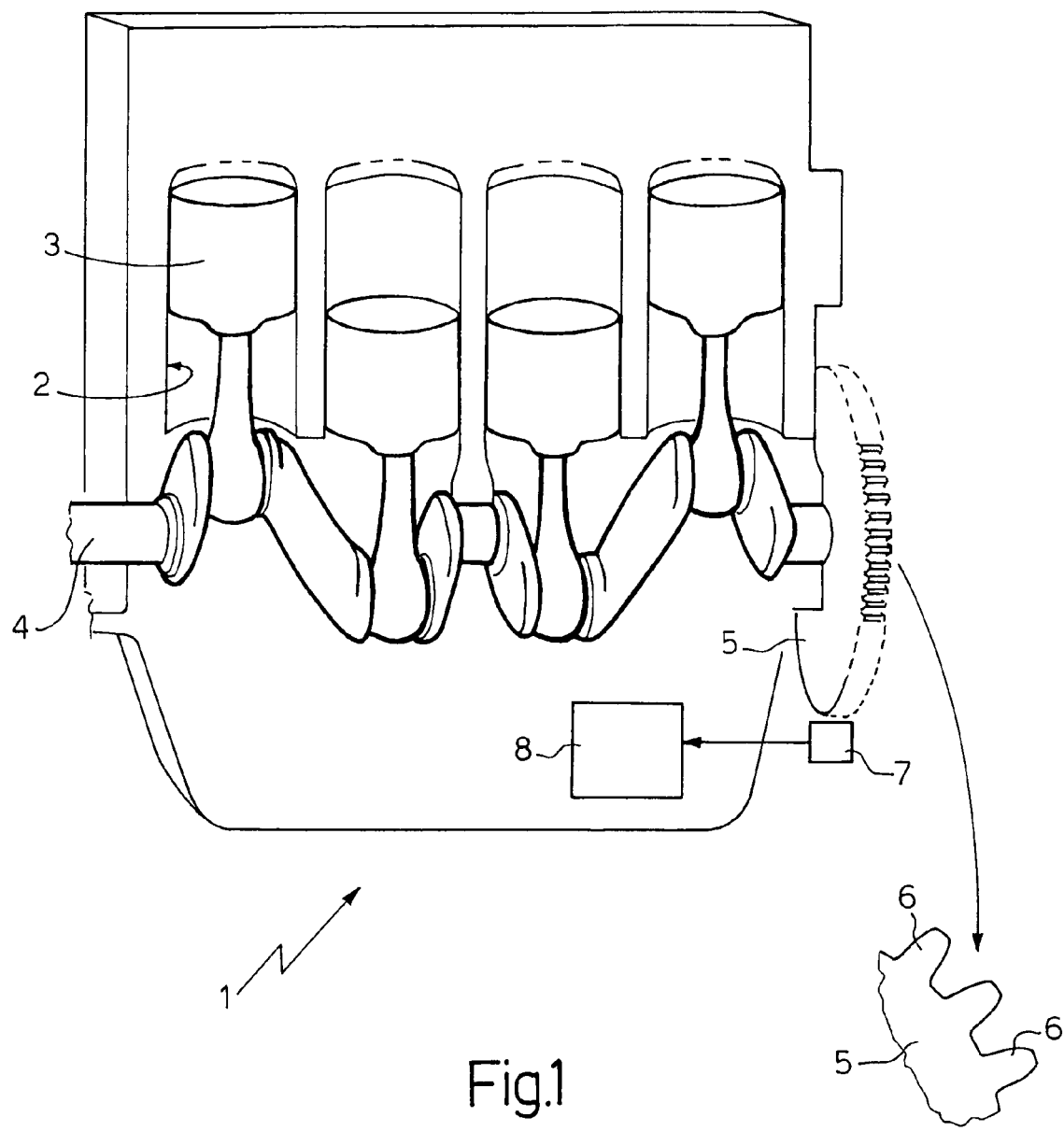
FIG. 1 is a diagrammatic view, in lateral elevation and cross-section, of an internal combustion engine provided with a control unit which implements the method for detecting misfiring of the present invention.

In FIG. 1, a petrol-driven internal combustion engine is shown overall by 1 and comprises four cylinders 2, each of which houses a respective piston 3 mechanically connected to a drive shaft 4 in order to transmit the force generated by the combustion of the petrol in the cylinder 2 to the drive shaft 4. A phonic wheel 5 provided with 60 teeth 6 and coupled to a sensor 7 adapted to detect the time interval between the passage of two consecutive teeth 6 is keyed on the drive shaft 4. The engine 1 further comprises a control unit 8, which is connected to the sensor 7 and is adapted to detect misfiring in the cylinders 2.

The methods used by the control unit 8 to detect misfiring, using the information supplied by the sensor 7 coupled to the phonic wheel 5, are described below.

For each complete rotation of the drive shaft 4 (and therefore of the phonic wheel 5), as many values acc of the angular acceleration of the drive shaft 4 are estimated as there are cylinders 2 performing combustion during a complete rotation of the drive shaft 4; with reference to the engine 1 shown in FIG. 1, two values acc of the angular acceleration of the drive shaft 4 are therefore estimated for each complete rotation of the drive shaft 4.

In each complete rotation of the drive shaft 4, two (equal to the number of cylinders 2 performing combustion during a complete rotation of the drive shaft 4) angular measurement sections having the same amplitude are identified, the time taken by the drive shaft 4 to travel each angular measurement section is measured, and the value acc of the angular acceleration of the drive shaft 4 at the ith instant is calculated by applying the following formula:

$$acc_i = \frac{T_{i+1} - T_i}{T_i^3}$$

in which:

$acc_i$ is the angular acceleration of the drive shaft 4 at the ith instant;

$T_{i+1}$ is the time taken by the drive shaft 4 to travel the (i+1)th angular measurement section;

$T_i$ is the time taken by the drive shaft 4 to travel the ith angular measurement section.

The time taken by the drive shaft 4 to travel each angular measurement section is measured using the signal supplied by the phonic wheel 5; by way of indication, each angular measurement section has an angular amplitude equal to a number of teeth 6 of the phonic wheel 5 of between 3 and 12. Preferably, each angular measurement section coincides substantially with the expansion stroke of a respective piston 3 or is at least partially superimposed on the expansion stroke of a respective piston 3.

Figure 2:
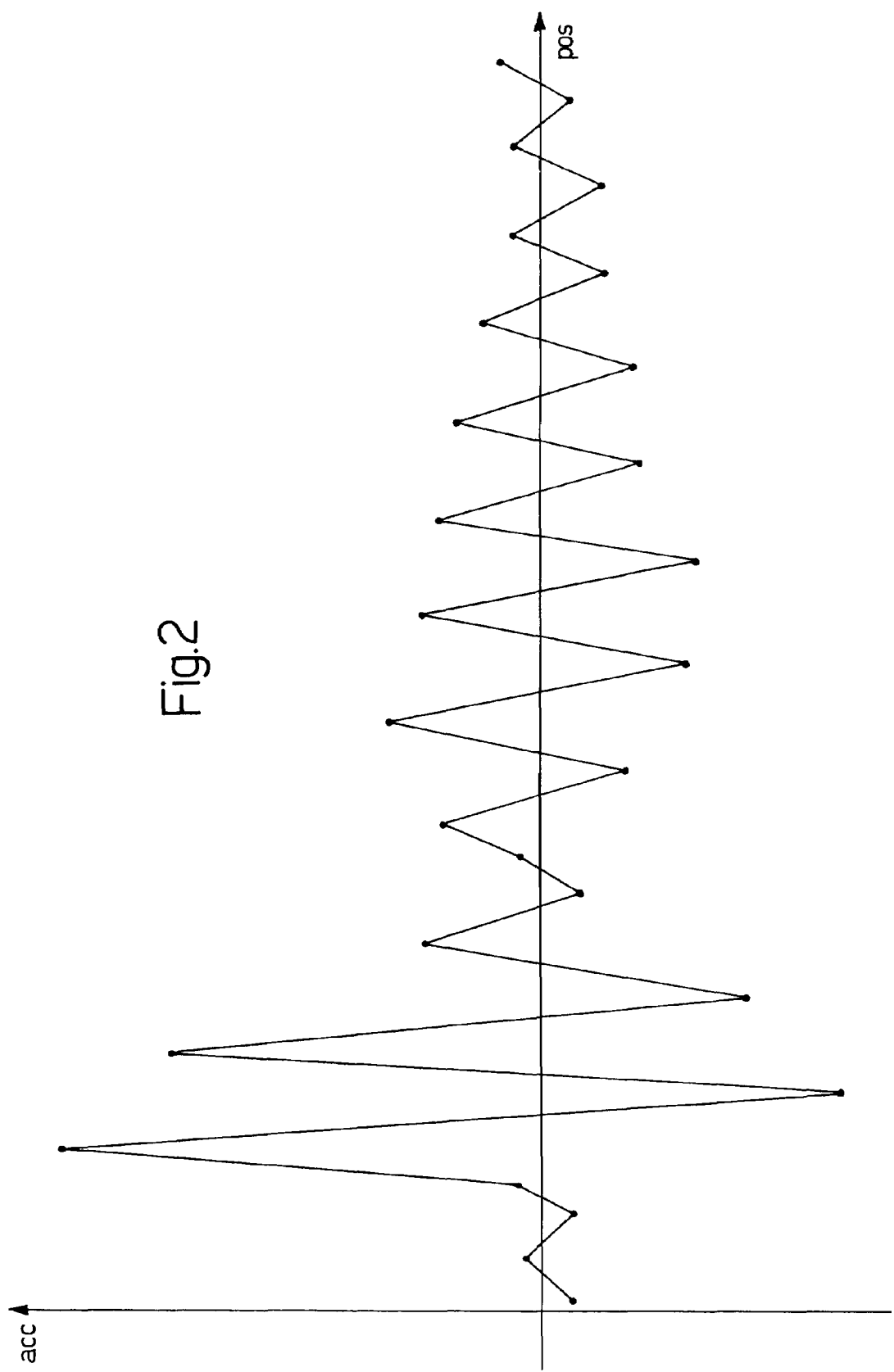
FIG. 2 is a diagram showing the variation of the value of the angular acceleration of the drive shaft as a function of the angular position of this drive shaft in the presence of a single misfire.

FIG. 2 is a diagram showing the variation of the value acc of the angular acceleration of the drive shaft 4 as a function of the angular position of this drive shaft 4 in the presence of a single misfire. FIG. 5 is a diagram showing the variation of the value acc of the angular acceleration of the drive shaft 4 as a function of the angular position of this drive shaft 4 in the presence of a double misfire.

It will be appreciated from FIGS. 2 and 5 that, following a misfire, the value acc of the angular acceleration of the drive shaft 4 presents a sequence of high values which tend gradually to fade, i.e. have a curve of a damped oscillatory type.

The norm (or absolute value) of each value acc of the angular acceleration of the drive shaft 4 is compared with a predetermined threshold value S which is preferably a function of the current engine point; the presence of misfiring is detected if the absolute value acc of the angular acceleration of the drive shaft 4 is greater than the predetermined threshold value S. When misfiring is detected, i.e. when an absolute value acc of the angular acceleration of the drive shaft 4 exceeds the threshold value S, a set of eight values acc of the angular acceleration of the drive shaft 4 subsequent to the value acc of the angular acceleration of the drive shaft 4 at which misfiring has been detected are filtered in order to eliminate the oscillation component caused by the misfire with respect to the value acc of the angular acceleration of the drive shaft 4; only the eight filtered values acc of the angular acceleration of the drive shaft 4 are then compared with the threshold value S to detect the presence of any subsequent misfires following the misfire detected.

It will be appreciated that the number of values acc of the angular acceleration of the drive shaft 4 to which filtering is applied may be other than eight and is generally between three and twelve; eight are preferably chosen bearing in mind that, in general, the oscillatory phenomenon of the value acc of the angular acceleration of the drive shaft 4 dies out within this duration.

The eight values acc of the angular acceleration of the drive shaft 4 following the value acc of the angular acceleration of the drive shaft 4 at which the misfire has been detected are filtered by algebraically adding a corresponding set of eight correction values to these values; these correction values are obtained at the design and development stage of the engine 1 by analysing the oscillation generated by a misfire with respect to the value acc of the angular acceleration of the drive shaft 4. The correction values may for instance be calculated by subtracting a corresponding set of values acc of the angular acceleration of the drive shaft 4 in the presence of a misfire from a set of values acc of the angular acceleration of the drive shaft 4 in standard conditions.

Figure 3:
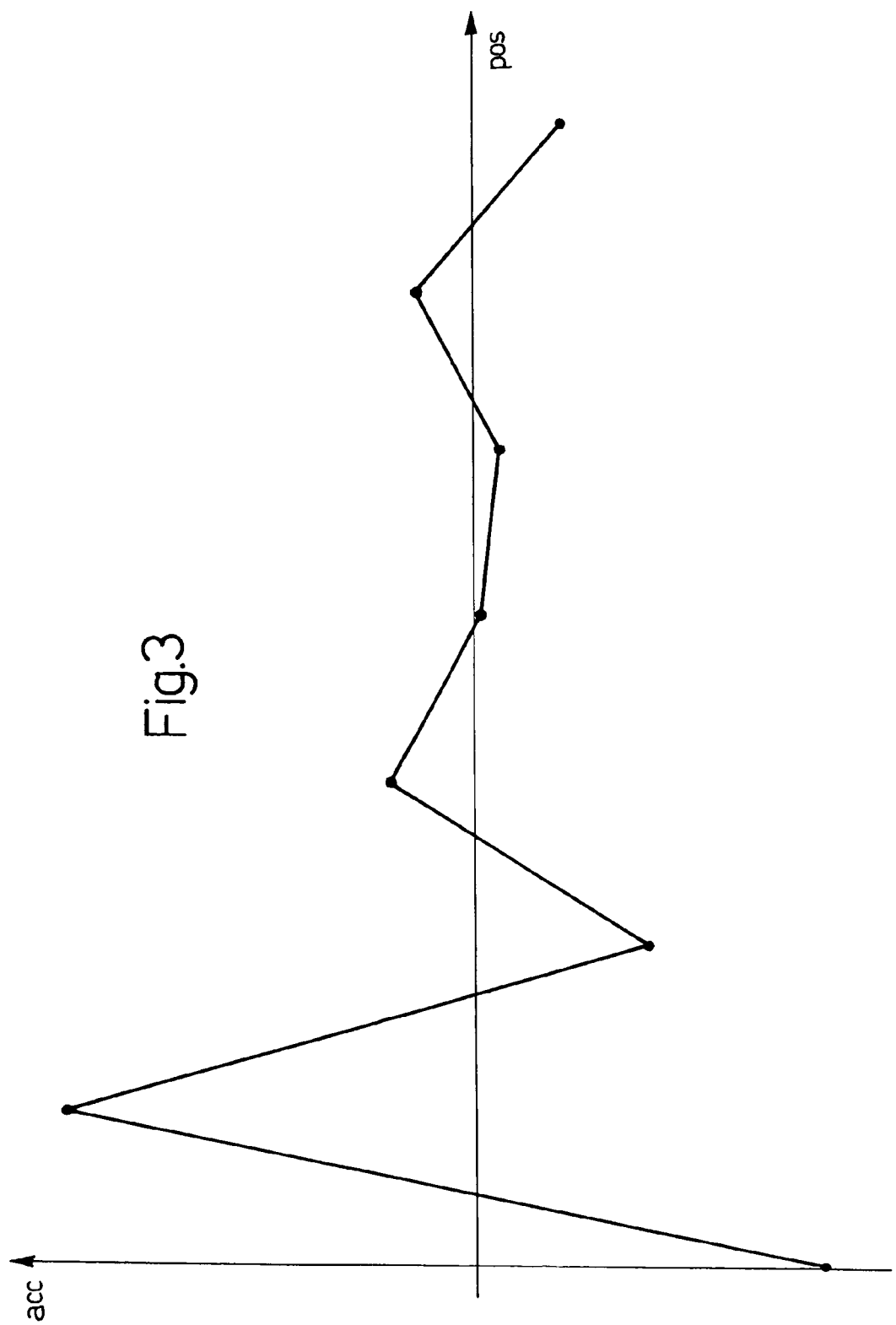
FIG. 3 is a diagram showing a set of eight correction values used by the control unit of FIG. 1.

By way of example, FIG. 3 is a diagram showing a set of eight correction values as a function of the angular position of the drive shaft 4.

In other words, the method described above to improve the ability to diagnose misfiring entails the isolation of the oscillatory disturbance which takes place with respect to the value acc of the angular acceleration of the drive shaft 4 following a single misfire and the successive use of this oscillatory disturbance to filter a set of eight values acc of the angular acceleration of the drive shaft 4 following each misfire.

FIG. 4 is a diagram showing the variation of the value acc of the angular acceleration of the drive shaft 4 of FIG. 2 after the application of the filtering process, i.e. after the eight correction values of FIG. 3 have been algebraically added to the values acc of the angular acceleration of the drive shaft 4 of FIG. 2. FIG. 6 is a diagram showing the variation of the value acc of the angular acceleration of the drive shaft 4 of FIG. 5 after the application of the filtering process, i.e. after the eight correction values of FIG. 3 have been algebraically added to the values acc of the angular acceleration of the drive shaft 4 of FIG. 5.

It will be appreciated from an examination of FIGS. 4 and 6 that the filtering method described above enables error-free detection of single or multiple misfires; in practice, the above-descried filtering makes it possible to eliminate the possibility of the control unit 8 confusing a single misfire with a multiple misfire.

In order to ensure that the detection of misfires is very reliable, the correction values have to be variable as a function of the engine point. For this reason, at the design stage of the engine 1, a plurality of salient engine points are identified, at each of which the corresponding sample set of correction values is calculated; during normal operation of the engine 1, the set of correction values corresponding to the current engine point is calculated by interpolating the sample sets of correction values. As an alternative, at the design stage of the engine 1, a plurality of salient engine points are identified, at each of which the corresponding sample set of correction values is calculated, and a single standard reference set independent from the engine point is calculated from the sample sets of correction values; during normal operation of the engine 1, the set of correction values corresponding to the current engine point is calculated from the standard reference set. In particular, the set of values acc of the angular acceleration of the drive shaft 4 and the set of correction values are expressed as angular acceleration of the drive shaft 4 as a function of the angular position of this drive shaft 4, while the standard reference set is expressed as a ratio between angular acceleration of the drive shaft 4 and engine load 1 as a function of time. The engine load 1 is preferably indicated by the flow of fresh air supplied to the engine 1.

Experimental tests have shown that the use of a standard reference set of correction values in place of a plurality of sample sets of correction values makes it possible considerably to reduce the memory occupation of the control unit 8 without substantial effects on the reliability and accuracy of the filtering method.

The invention claimed is:

1. A method for detecting misfiring in an internal combustion engine (1) by analysing the angular acceleration (acc) of the drive shaft (4); the method comprising the steps of:
   estimating the value (acc) of the angular acceleration of the drive shaft (4) at predetermined angular positions of this drive shaft (4);
   comparing the absolute value (acc) of the angular acceleration of the drive shaft (4) with a predetermined threshold value (S);
   detecting the presence of a misfire if the absolute value (acc) of the angular acceleration of the drive shaft (4) is greater than the predetermined threshold value (S);
   filtering, when the presence of a misfire is detected, when an absolute value (acc) of the angular acceleration of the drive shaft (4) exceeds the threshold value (S), a set of values (acc) of the angular acceleration of the drive shaft (4) subsequent to the value (acc) of the angular acceleration of the drive shaft (4) at which the misfire has been detected to eliminate the oscillation component generated by the misfire with respect to the value (acc) of the angular acceleration of the drive shaft (4); and
   comparing only the filtered values (acc) of the angular acceleration of the drive shaft (4) with the threshold value (S) to detect the presence of any further misfires subsequent to the misfire detected.

2. A method as claimed in claim 1, including filtering the values (acc) of the angular acceleration of the drive shaft (4) subsequent to the value (acc) of the angular acceleration of the drive shaft (4) at which the misfire has been detected are filtered by algebraically adding to these values a corresponding set of correction values obtained at the desigu and development stage of the engine (1) by analysing the oscillation generated by a misfire with respect of the value (acc) of the angular acceleration of the drive shaft (4).

3. A method as claimed in claim 2, including calculating the correction values are calculated by subtracting a corresponding set of values (acc) of the angular acceleration of the drive shaft (4) in the presence of a misfire from a set of values (acc) of the angular acceleration of the drive shaft (4) in standard conditions.

4. A method as claimed in claim 2, wherein the correction values are variable as a function of the current engine point.

5. A method as claimed in claim 4, wherein, at the design stage of the engine (1), a plurality of salient engine points are identified, at each of which the corresponding sample set of correction values is calculated, and during the normal operation of the engine (1), the set of correction values for the current engine point is calculated by interpolating the sample sets of correction values.

6. A method as claimed in claim 4, wherein, at the design stage of the engine (1), a plurality of salient engine points are identified, at each of which the corresponding sample set of correction values is calculated, and a single standard reference set independent from the engine point is calculated from the sample sets of correction values, and during the normal operation of the engine (1), the set of correction values for the current engine point is calculated from the standard reference set.

7. A method as claimed in claim 6, including expressing the set of values (acc) of the angular acceleration of the drive shaft (4) and the set of correction values as angular acceleration of the drive shaft (4) as a function of the angular position of the drive shaft (4), the standard reference set being expressed as a ratio between angular acceleratfon of the drive shaft (4) and engine load (1) as a function of time.

8. A method as claimed in claim 7, wherein the engine load (1) is indicated by the flow of fresh air supplied to the engine (1).

9. A method as claimed in claim 1, including filtering a set of eight values (acc) of the angular acceleration of the drive shaft (4) are filtered from the value (acc) of the angular acceleration of the drive shaft (4) at which the misfire has been detected.

10. A method as claimed in claim 1, wherein the threshold value (S) for the detection of the misfire is a function of the current engine point.

11. A method as claimed in claim 1, wherein, for each complete rotation of the drive shaft (4), as many values (acc) of the angular acceleration of the drive shaft (4) are estimated as there are cylinders (2) performing combustion during a complete rotation of the drive shaft (4).

12. A method as claimed in claim 1, wherein, in each complete rotation of the drive shaft (4), as many angular measurement sections having the same amplitude are identified as there are cylinders (2) performing combustion during a complete rotation of the drive shaft (4), the time taken by the drive shaft (4) to travel each angular measurement section being measured, and the value (acc) of the angular acceleration of the drive shaft (4) at the ith instant being calculated by applying the following formula:

$$acc_i = \frac{T_{i+1} - T_i}{T_i^3}$$

in which:
   $acc_i$ is the angular acceleration of the drive shaft (4) at the i-th moment;
   $T_{i+1}$ is the time used by the drive shaft (4) to pass over the (i+1)-th angular measurement line;
   $T_i$ is the time used by the drive shaft (4) to pass over the i-th angular measurement line.

13. A method as claimed in claim 12, including measuring the time taken by the drive shaft (4) to travel each angular measurement section is measured using the signal supplied by the phonic wheel (5) which is provided with a disc having 60 teeth (6), each angular measurement section having an angular amplitude equal to a number of teeth (6) of the phonic wheel (12) of between 3 and 12.

14. A method as claimed in claim 12, wherein each angular section is at least partially superimposed with respect to the expansion stroke of a respective piston (3).

15. A method as claimed in claim 12, wherein each angular section substantially coincides with the expansion stroke of a respective piston (3).

* * * * *